3,360,391
PROCESS FOR THE PRODUCTION OF CORROSION RESISTANT AND HIGHLY WEAR-RESISTANT COATED SURFACE AND THE COATED SURFACE
Hermann Richtzenhain, Cologne-Sulz, and Manfred Simon, Niederkassel, Troisdorf, Germany, assignors to Dynamit Nobel Aktiengesellschaft, Troisdorf, Bezirk Cologne, Germany, a corporation of Germany
No Drawing. Filed July 29, 1963, Ser. No. 298,496
Claims priority, application Germany, Aug. 1, 1962, D 39,528
19 Claims. (Cl. 117—26)

The present invention relates to the production of corrosion-resistant and highly wear-resistant coatings, and more particularly to a process for the manufacture of such coatings using a mixture of epoxy resin, a flexibilizer compound, a hardening agent for the epoxy resin, as well as at least one of corundum and silicon carbide.

It is known that coatings can be produced on various objects and surfaces by the application of mixtures of epoxy resin, granular mineral fillers, and appropriate hardeners for the resin. The coatings produced by the methods that have been used heretofore are not entirely satisfactory, especially as regards hardness, strength, wear-resistance, slip-resistance, i.e. friction, and flexibility characteristics which may be desired.

It is an object of the present invention to overcome the foregoing drawbacks and to provide a corrosion-resistant and highly wear-resistant coating and a process for manufacturing the same, said coating being also slip-resistant, highly flexible and strongly adhesive.

It is a further object of the present invention to provide such a coating having higher wear-resistance and stronger inherent adhesion than concrete.

Other and further objects of the present invention will become apparent from a study of the within specification and accompanying examples.

It has been found in accordance with the present invention that a corrosion-resistant, highly wear-resistant coating may be provided by applying to the surface to be coated a mixture of epoxy resin, oxygen-containing flexibilizer compound, epoxy resin-hardening agent and a filler selected from the group consisting of corundum, silicon carbide, and mixtures thereof, and allowing the mixture to harden in situ.

Generally the epoxy resin is a polyepoxide which is liquid at room temperature and contains at least 2 epoxy equivalents per molecule, with the flexibilizer compound being present in an amount of between about 1–20% by weight based on the resin quantity. On the other hand, the filler is present in the mixture in the form of dust having a particle size of between about 0–60 microns and in an amount of between about 10–200% by weight based on the resin quantity as well as in the form of granules having a particle size between about 0.07–2 mm. and in an amount between about 100–900% by weight based on the resin quantity.

Suitably, the epoxy resin is selected from the group consisting of glycidyl ethers of polyvalent phenols, mixtures of glycidyl ethers of polyvalent phenols and glycidyl ethers of polyvalent aliphatic alcohols, and mixtures of glycidyl ethers of polyvalent phenols and N-glycidyl compounds. The flexibilizer compound is selected from the group consisting of aliphatic monoepoxides having preferably more than 6 carbon atoms in the chain, glycidyl ethers of aliphatic alcohols having preferably more than 4 carbon atoms in the chain, glycidyl ethers of aliphatic mercaptans having preferably more than 4 carbon atoms in the chain, dialkyl esters of β-thiodialkanoic acid, and mixtures thereof. On the other hand, the hardening agent is generally selected from the group consisting of aliphatic polyamines, polyethers of aliphatic oxyamines and polyvalent aliphatic alcohols, aromatic polyamines, cycloaliphatic polyamines, amino-substituted heterocyclic compounds, amidoamines obtained by condensation of polymerized unsaturated fatty acids with aliphatic polyamines, polyfunctional mercapto compounds, and mixtures thereof.

In accordance with one embodiment of the invention, a hardening accelerator may be added to the mixture to shorten the hardening time thereof, such accelerator being conveniently selected from the group consisting of monovalent phenols, polyvalent phenols, monovalent aliphatic alcohols, polyvalent aliphatic alcohols, mercapto compounds, and thioether compounds.

In the same way, a plasticizer may also be included in the mixture as well as a pigment and/or a thixotropic substance for obtaining the correspondingly desired characteristics in the mixture in question.

In accordance with one particular embodiment of the present invention the mixture is applied in a first coating portion having a thickness of between about 60–200 microns, preferably 80–150 microns, and containing the filler in the form of dust having a particle size of between about 5–60 microns and in an amount of between about 50–150% by weight based on the resin quantity, and thereafter in a second coating portion containing the filler in the form of granules having a particle size of between about 0.12–1 mm. and in an amount of between about 150–300% by weight based on the resin quantity.

On the other hand, an alternate particular embodiment of the invention contemplates the applying of the mixture in such a way that first the resin, flexibilizer compound and hardening agent in admixture are spread onto the surface to be coated, and after initial, partial hardening the filler is spread over the so-coated surface and forced by mechanical pressure into the initially partially hardened coating, whereby the filler will tend to remain at the surface of the mixture to impart its desired properties thereat.

Where the filler is corundum, the same preferably possesses an aluminum oxide content of between about 95–100% by weight and correspondingly a titanium dioxide content of between about 0–4% by weight, the remainder representing impurities. The corundum dust which is used advantageously possesses a particle size of between about 5–60 microns and is present in an amount of between about 50–150% by weight based on the resin quantity, in accordance with a preferred embodiment of the invention, whereas the corundum granules which are present possess a particle size of between about 0.12–1 mm. and are present in an amount of between about 150–300% by weight based on the resin quantity.

Therefore, in accordance with the present invention a corrosion-resistant, slip-resistant, highly wear-resistant, highly flexible and strongly adhesive hardened epoxy resin coating may be provided in covering disposition on a surface of an article being treated therewith, the said resin coating having high wear-resistance and stronger inherent adhesion than concrete. Such resin coating contains in the unhardened state a mixture of an epoxy resin consisting of a polyepoxide having at least 2 epoxy equivalents per molecule, said epoxy resin being liquid at room temperature and/or ordinary temperatures and being of the type above defined, a flexibilizer compound in an amount of between about 1–20% by weight based on the resin quantity, said flexibilizer compound being of the type above defined, and a filler of the type above defined, said filler being present in the mixture in the form of dust having a particle size of between about 0–60 microns and in an amount of between about 10–200% by weight based on the resin quantity and in the form of granules having a particle size of between about 0.07–2 mm. and in an amount of between about 100–900% by weight based on the resin quantity, said coating being produced by applying the aforesaid mixture of resin, flexibilizer compound, hardening agent and filler in the unhardened state to the surface to be coated and allowing such mixture to harden in situ for about 1–3 hours.

Significantly, in accordance with the present invention, by using corundum and/or silicon carbide as a filler in a mixture of the epoxy resin, flexibilizing additives and hardening agents, coatings may now be produced having mechanical properties which are far better than those of coatings previously produced. Advantageously, the coatings in accordance with the present invention can be applied to the surface of the object in question in a single layer or in more than one layer as will be appreciated more fully hereinafter. As the artisan will appreciate, the method of application which is best will depend upon the nature of the surface to be coated and the qualities desired in the coating so-produced.

The mixtures can be applied in the form of a plurality of coats. This plurality of coats can be built-up in the following manner for the achievement of markedly good and effective adhesive qualities:

First of all, a prime coat is applied to the surface in question, and this prime coat consists of an epoxy resin that is liquid at ordinary temperatures, a reactive additive that produces a flexibilizing effect, a suitable hardening agent, and 10–200% and preferably 50–150%, by weight, corundum dust having a particle size between about 5–60 microns. Over this prime coat, whose thickness is to be maintained between about 60–200 microns, and preferably between about 80–150 microns, a second epoxy resin coat is applied in brushable or paste form, i.e. spreadable form, which contains, instead of fine corundum dust, corundum granules of a particle size ranging between about 0.07–2 mm., and preferably between about 0.12–1 mm. The thickness of the second coating can vary between about 0.5–6 mm., but preferably between 2–4 mm. Generally, the amount of filler in the second coat for best results can vary between about 300–900% by weight of the resin mixture present, consisting of resin, flexibilizer, plasticizer and hardening agent. At least some of the corundum, of course, can be replaced by silicon carbide. Nevertheless, synthetic corundum has proven to be especially well suited for the production of corrosion-resistant, highly wear-resistant coatings in accordance with the present invention, and especially the commercially available synthetic corundums which have an aluminum oxide content of between about 95–100% by weight and a titanium dioxide content of between about 0–4% by weight. Besides the second coating further coatings can be applied. The number of coatings depend on the desired thickness. If the resin (epoxy resin plus flexibilizer, plasticizer and hardening agent)-filler-ratio is 1 to 4 and greater than 4, one coating on the prime coat has proven to be sufficient. In the case of a resin-filler-ratio of 1 to smaller than 4 the number of applied coatings depend on the desired thickness.

A coating of the foregoing type, produced in accordance with the present invention, possesses a wear-resistance which is considerably higher than that of concrete as may be more fully appreciated from the following data. For example, the wear of a coating made according to the invention is 3.5 cm.$^3$ per 50 cm.$^2$ as compared with 15 cm.$^3$ per 50 cm.$^2$ in the case of concrete (according to the German industrial standard DIN 52,108). The compressive strength (as per DIN 1100) of the coating made according to the invention is 800 to 1,000 kg. per cm.$^2$ as opposed to 300 kg. per cm.$^2$ for a coating made according to German patent specification 1,091,733, using quartz sand as a filler. On the other hand, the adhesivity of the coating according to the invention to concrete considerably exceeds the inherent strength of the concrete itself. This is apparent from the fact that, in the tear-away tests performed, the specimens failed within the concrete itself, and not at the junction between the coating and the concrete. Significantly, the high flexibility of a coating applied to a metal plate according to the invention is clearly apparent from the fact that the metal plate can be bent to an angle of 90° without any cracking or lifting of the coating from the metal.

As opposed to coatings in which a large amount of filling is desired, whereby more than one layer or coat of the mixture is applied to the surface, coatings with a medium filling can be applied in a single layer or coat. It is recommendable to add to such a one-coat or single layer covering material an amount of corundum or silicon carbide dust not exceeding 100% by weight of the amount of resin and granular corundum in a quantity of not more than 300% by weight of the resin quantity.

In order to achieve very favorable slip-proof or high friction non-slip surfaces, unfilled resin containing the flexibilizer and hardening agent in admixture therewith can also be applied to the surface of the article in question and, after at least initial, partial hardening, corundum or silicon carbide can be spread over the surface and rolled into the settling mixture, as for example by a heavy metal roller, a tamping tool, and the like.

Actually, all polyepoxides have at least 2 epoxy equivalents per molecule and which are liquid at room temperature or which can be liquified by the addition of suitable flexibilizers can be used as the epoxy resins for the mixtures in accordance with the present invention. The preferred epoxy resins are, of course, the glycidyl ethers of polyvalent phenols, i.e. o-, m-, and p-dihydroxybenzenes including resorcinol, orcinol, dihydroxyxylol, etc., triphenols, including pyrogallol, phloroglucinol, methylpyrogallol, etc. and other trihydroxybenzenes, polyphenols, polynuclear phenolic compounds, such as dihydroxy-diphenyl substituted methane and ethane, especially the diglycidyl ether of 4,4'-dihydroxy-diphenyl-propane. However, it will be appreciated that mixtures of glycidyl ethers of polyvalent phenols and glycidyl ethers of polyvalent aliphatic alcohols, such as ethylene glycol, propylene glycol, butylene glycol etc., glycerol, trimethylol propane, etc. can be used, and also N-glycidyl compounds, such as N,N-diglycidyl aniline, N,N-diglycidyl-N,N'-dimethyl-4,4'-diamino-diphenylmethane etc. A particularly favorable coating is obtainable where the liquid epoxy resin is made from bisphenol A and epichloro-hydrin as noted above.

In order to obtain coatings of especially high flexibility, 1–20% by weight, and preferably 5–15% by weight, based on the resin quantity present, of one or more flexibilizers should be added to the epoxy resin. The suitable flexibilizers include, of course, aliphatic monoepoxides with more than 6 carbon atoms in the chain, and particularly 8 to 12 carbon atoms, including alkylmonoepoxides, such as 1,2-epoxyoctane, 1,2-epoxydodecane, and the like, although an especially favorable flexibilizing effect is obtained with glycidyl ethers of aliphatic alcohols or mercaptans (thioalcohols) having more than 4 and preferably more than 6 carbon atoms in the chain, especially alkylols and alkyl mercaptans having 6–12 carbon atoms. Among the alcohols or mercaptans which may be used in this connection are, for example, pentanol, hexanol, octanol, 2-ethylhexanol, decanol, dodecanol, dodecylmercaptan, and alcohols having alkoxy groups in the 2-position with more than 2 carbon atoms, such as 2-alkylalkoxy-alkylols, and particularly 2-lower alkyl-lower alkoxy alkylols, including 2-ethylhexyloxy-ethanol whereby to form the glycidyl ethers of such alkylols and alkylmercaptans, and especially the glycidyl ethers of 2-alkyl-hexyloxy-ethanols. Also, the dialkylesters and particularly the di-lower alkylesters, such as the dimethyl-, diethyl-, dipropyl-, dibutyl-, etc. esters of β-thiodialkanoic acids and especially β-thiodi-lower alkanoic acids, such as β-thiodipropionic acid can be used as effective flexibilizers.

Specific flexibilizers include 2-ethylhexylglycide ethers, lauryl glycide ether, glycerindiglycide ether, 2-(2-ethyl hexyloxy)-ethylglycide ether, β-thiodipropionic acid dimethyl ester, etc., mixtures of flexibilizers, such as glycerin diglycide ether and 2-ethylhexylglycide ether, etc.

The known epoxy hardening agents can be used as hardeners for the aforementioned epoxy resins in accordance with the present invention, those hardening agents being used which preferably harden the epoxy resin at room temperature. Among these are especially the aliphatic polyamines, such as alkylpolyamines and particularly lower alkyl polyamines, including diethylene triamine, triethylenetetra-amine, tetraethylene pentamine, and the like, N,N - dialklyethylenediamine, N,N - dialkypropylenediamine, and the like, including N,N-di-lower alkyl-lower alkylene diamine, for example N,N-dimethyl-ethylenediamine, N,N-diethyl-ethylenediamine, N,N-dipropyl-ethyl-endiamine, N,N-dibutyl-ethylenediamine, and the corresponding propylene-, butylene-, etc. diamines; N-oxyalkyl-alkylenediamine or N-oxyalkylalkylene polyamine including N-oxy-lower alkyl ethylenediamine, for example N-oxyethyl-, N-oxypropyl-, N-oxybutyl-, etc. ethylene diamines; polyethers of aliphatic oxyamines and polyvalent aliphatic alcohols and the like, including 1,4-butylene glycoldiaminopropylether, diethyleneglycol-di-(α - amino-propyl)-ether etc., aromatic polyamines, such as arylpolyamines, including diaminodiphenyl methane, etc.; cycloaliphatic polyamines, such as 4,4'-diaminodicyclohexylmethane, 4,4'-diaminodicyclohexylpropane, N-cyclohexyl-1,3-diaminopropane, and the like; amino compounds of heterocyclenes, such as amino-substituted compounds of tetrahydropyridine, piperidine, and other heterocyclic compounds. The amidoamines obtainable by condensing polymerized unsaturated fatty acids with aliphatic polyamines have proven also to be suitable hardening agents in accordance with the present invention, such as the Versamids and Genamides being marketed by General Mills, Inc., Minneapolis, Minn. (USA), and the Merginamides traded by the Harburger Fettchemie, Hamburg-Harburg (Germany). For achieving quite especially high chemical resistance, it will be appreciated that it is advantageous to use mixtures of different hardeners of the foregoing types. The epoxy resin can also be hardened with polyfunctional mercapto compounds as known to the art such as Thiokol LP-3 being traded by the Thiokol Chemical Corp., Trenton, N.J. (USA).

The hardening agent will be used preferably in stoichiometric quantities, that means that the amount of the hardening should correspond with the number of H-atoms bond to the nitrogen atoms capable of reacting with the epoxide groups present.

The hardening time can be shortened, if desired, by the addition of accelerators of the group including monovalent and/or polyvalent phenols, especially amino-substituted mono- and poly-valent phenols, such as 2,4,6-tris-(dimethylaminomethyl)-phenol, or the monovalent or polyvalent aliphatic alcohols, or also by means of compounds containing mercapto or thioether groupings, such as the dialkyl esters of β-thiodialkanoic acid.

If desired, plasticizers, such as triphenyl phosphite may be included in the mixture and/or pigments, and/or thixotropic substances such as bentonite, finely divided silicic acid, especially that available under the commercial name of Aerosil (a product of Degussa, Frankfurt, Germany), and the like. Lead chromate and zinc dust may be used as additives to the prime coat on metals.

It will be appreciated that the instant invention is not limited to the manufacture of coatings consisting of one or two layers, inasmuch as even more than two coats can be applied, depending upon the required thickness of the final coating being provided by the separate successive layers or coats of the mixture in question.

The following examples are set forth for the purpose of illustrating the present invention, and it will be understood that the same are not meant to limit the scope of invention.

Example 1

A charge of 90 parts by weight of a liquid epoxy resin, which is made from Bisphenol A and epichlorohydrin and the molar ratio of the reactants being 1:10, and contains 0.53 epoxy equivalent per 100 grams of resin corresponding to 2 epoxide groups per molecule, and 10 parts of 2-ethylhexylglycide ether (flexibilizer) is mixed with 14 parts of 4,4'-diaminodicyclohexylmethane (hardening agent) and 14 parts of 1,4-butyleneglycoldiaminopropyl ether (hardening agent), and 128 parts of corundum dust having a particle size of 5 to 60 microns (filler), and the resulting mixture is applied to a concrete surface in a coating of about 100 microns in thickness. Another part of the above-stated resin-flexibilizer-hardener mixture is admixed, in this case preferably in a forced-flow mixer equipped with marginal scrapers, with 9 parts of corundum of the following composition:

30% corundum of the size 0.12–0.25 mm.
40% corundum of the size 0.25–0.5 mm.
30% corundum of the size 0.5–1 mm.

The corundum used in this example is a commercially available electric furnace corundum having an alumina content of 96% and a titanium dioxide content of 3%.

The mixture of resin and corundum can be applied very easily in any desired thickness with a trowel and/or smoothing tool, and the pot life is between about 1 to 2 hours, depending upon the size of the batch. A smooth, wear-resistant, slip-proof, chemical-resistant and dust-free coating is obtained, which can be walked on after 24 hours when hardening takes place at room temperature. Such a coating has been used for over a year in a potash plant (as floor coating) without any apparent deterioration due to splashed potash solutions or by mechanical stress. The coating is resistant not only to gasoline and oil but also to fruit acids as well, such as a 10% aqueous solution of citric acid. 7.8 kg. of the second resin-corundum mixture per m.$^2$ are resulting a coat of about 3 mm. thickness.

Example 2

A charge of 90 parts of the epoxy resin described in Example 1 is mixed with 10 parts of laurylglycide ether (flexibilizer), 25 parts of triphenylphosphite (plasticizer), 55 parts of a product made by the condensation of dimeric fatty acids with various polyamides and marketed under the trade name of Versamid 140 (hardening agent), and 100 parts corundum dust having a particle size between 5–60 microns (filler). The resulting mixture is then admixed in a ratio of 1:2 parts by weight with corundum of the following grain-size composition:

30% corundum between 0.17 and 0.12 mm.
40% corundum between 0.12 and 0.25 mm.
30% corundum between 0.25 and 0.5 mm.

A brushable and spreadable mixture is thus produced which can be applied easily to the surface to be coated. Finally, another mixture of corundum and silicon carbide (2 parts of corundum mixed with 1 part of silicon carbide) having an over-all grain size of 0.5 to 1 mm. is sprinkled over the coating and rolled in by means of a mechanical roller. 1.5 to 2 kg. of the mixture of corundum and silicon carbide are sprinkled over the coating per m.$^2$. The excess grit is swept away the next day and a flexible, wear-resistant and impact-resistant coating is thus obtained. The resulting ratio of resin plus hardening agent to the filler is 1:4 to 1:5.

Example 3

A charge of 85 parts of the epoxy resin described in Example 1, 10 parts of glycerin diglycidyl ether and 5 parts of 2-ethylhexylglycidyl ether (mixture of flexibilizing agents) is mixed with 14.5 parts of 4,4'-diamino-dicyclohexylmethane and 14.5 parts of 1,4-butyleneglycoldiaminopropyl ether (mixture of hardening agents), and 110 parts of corundum dust having a particle size between 5 to 60 microns as well as 200 parts of corundum grit or granules having a particle size between about 0.07–0.5 mm. (filler), and the resulting mixture is troweled onto a concrete surface. 2 kg. per m.² are resulting a coat of 1 mm. thickness. An oil- and gasoline-proof and slip-proof coating is accordingly obtained.

*Example 4*

After preliminary air blasting with corundum (1 to 2 mm. grit or particle size) for cleansing the surface of an iron plate, the plate is given a prime coat about 150 microns thick, which coat is composed of a mixture of 90 parts of the epoxy resin described in Example 1, 10 parts of 2-ethylhexylglycide ether (flexibilizer), 25 parts of triphenylphosphite (plasticizer), 55 parts of a product of the condensation of dimeric fatty acid with various polyamines marketed under the trade name of Versamid 140, as aforesaid (hardening agent), 50 parts of zinc dust (additive) and 50 parts of corundum dust having a grain size of between about 5–60 microns (filler). A second coat of a mixture made with the same formula but without zinc dust being included is applied after about 3 hours over the first coat, using a lambskin roller, the thickness of the second coat again being about 150 microns. Corundum (1.5 kg. per m.²) having a grain size of 0.5–1 mm. is thereafter sprinkled and rolled into the second coat of the mixture and after 15 to 20 hours the excess grit can be swept away. The metal plate thus coated can be bent 90° with no sign of damage to the surface, i.e. the coating on the metal. A drop test, in which a 5 kilogram weight equipped with a point, cutting edge or ball on the under side and dropped from a height of 1.50 meters onto the so-coated metal plate, shows that the coating withstands this stress and does not chip off in any of the cases tested, i.e. with the point, cutting edge, and ball tests.

*Example 5*

A corundum-air blasted aluminum plate is coated with a mixture of 90 parts of the epoxy resin described in Example 1, 10 parts of β-dithiopropionic acid dimethylester (acting as flexibilizer, as well as accelerator), 50 parts of a product of the condensation of dimeric fatty acids with various polyamines and marked under the trade name of Versamid 140 (hardening agent), and 50 parts of corundum dust having a grain size between about 5–60 microns (filler), and after 2 hours the coating is sprinkled with corundum granules (0.75 to 1 kg. per m.²) having a particle size of between about 0.25–0.5 mm. The grit or granules are then rolled into the surface of the coating, and the excess is swept away on the following day. An outstanding slip-proof covering is thus obtained.

*Example 6*

An iron plate, previously treated in the manner set forth in Example 4, is given a prime coat consisting of a mixture of 90 parts of the epoxy resin described in Example 1, 10 parts of 2-(2-ethyl-hexyloxy)-ethylglycidyl ether (flexibilizer), 10 parts of triphenylphosphite (plasticizer), 55 parts of a product of the condensation of dimeric fatty acids with various polyamines marketed under the trade name of Versamid 140 (hardening agent), 50 parts of lead chromate (pigment), and 50 parts of corundum dust having a particle size of 0–60 microns (filler). Four hours later, a paste is troweled onto the prime coat, consisting of 90 parts of the epoxy resin noted above, 10 parts of 2-ethylhexylglycide ether (flexibilizer), 10 parts of triphenylphosphite (plasticizer), 55 parts of a product of the condensation of dimeric fatty acids with various polyamines marketed under the trade name Versamid 140 (hardening agent), 5 parts of a finely divided silicic acid marketed under the trade name Aerosil (thixotropic agent), and 99 parts of corundum having a particle size of 0.07–0.12 mm., 132 parts of corundum having a particle size of 0.12–0.25 mm., and 99 parts of corundum having a particle size of 0.25–0.5 mm. (filler). This was followed by the sprinkling on and rolling in by means of a mechanical roller of corundum granules (1.5–2 kg. per m.²) having a grit size of 0.5–1 mm. After 1 day the excess grit is swept away and the plate thus coated is exposed for 4 months to the stress of heavy road traffic, without any damage of any kind being observed.

*Example 7*

A corundum-air blasted aluminum plate is coated with a mixture of 90 parts of epoxy resin as in Example 1, 10 parts of 2-ethylhexylglycide ether (flexibilizer) 50 parts of a product of the condensation of dimeric fatty acids with various polyamines marketed under the trade name of Versamid 140 (hardening agent) and 5 parts of 2,4,6-tris-(dimethylaminomethyl)-phenol (accelerator). After 2½ hours, corundum (0.75–1 kg. per m.²) having a grit size of 0.5–1 mm. is sprinkled on and rolled in by mechanical roller (filler), and the excess is swept off on the next day. With the surface of the coating protected with the filler in the aforesaid manner, the drop and bending tests described in Example 4 above are carried out with similar results, i.e. the coating withstanding all stresses without any chipping away of the coating.

*Example 8*

A charge of 90 parts of the epoxy resin described in Example 1 is mixed with 5 parts of laurylglycide ether (flexibilizer), 5 parts of octylene epoxide (1,2-epoxyoctane) acting as flexibilizer, 25 parts of triphenylphosphite (plasticizer), 55 parts of a product made by the condensation of dimeric fatty acids with various polyamides and marketed under the trade name of Versamid 140 (hardening agent), and 100 parts corundum dust having a particle size between 5–60 microns (filler). The resulting mixture is then admixed in a ratio of 1:2 parts by weight with corundum of the following grain-size composition:

30% corundum between 0.17 and 0.12 mm.
40% corundum between 0.12 and 0.25 mm.
30% corundum between 0.25 and 0.5 mm.

A brushable and spreadable mixture is thus produced which can be applied easily to the surface to be coated. Finally, another mixture of corundum and silicon carbide (2 parts of corundum mixed with 1 part of silicon carbide) having an over-all grain size of 0.5 to 1 mm. is sprinkled over the coating and rolled in by means of a mechanical roller. 1.5 to 2 kg. of the mixture of corundum and silicon carbide are sprinkled over the coating per m.². The excess grit is swept away the next day and a flexible, wear-resistant and impact-resistant coating is thus obtained. The resulting ratio of resin plus hardening agent to the filler is 1:4 to 1:5.

*Example 9*

A charge of 85 parts of the epoxy resin described in Example 1, 10 parts of glycerindiglycidylether and 5 parts of 2-ethylhexylglycidyl ether (mixture of flexibilizing agents) is mixed with 14.5 parts of N-cyclohexyl-1,3-diaminopropane and 14.5 parts of 1,4-butyleneglycoldiaminopropyl ether (mixture of hardening agents), and 110 parts of corundum dust having a particle size between 5 to 6 microns as well as 200 parts of corundum grit or granules having a particle size between about 0.07–0.5 mm. (filler), and the resulting mixture is troweled onto a concrete surface. 2 kg. per m.² are resulting a coat of 1 mm. thickness. An oil- and gasoline-proof and slip-proof coating is accordingly obtained.

*Example 10*

A resin-hardening agent mixture was prepared by mixing 90 parts of the epoxy resin described in Example 1 with 10 parts of 2-ethylhexylglycidyl ether (flexibilizer), 13 parts of N-cyclohexyl-1,3-diaminopropane and 14 parts of 1,4-butyleneglycoldiaminopropyl ether (mixture of hardening agents), and 1 part of phenol (accelerator). To the above mixture of 128 parts of corundum dust having a particle size between 5 to 60 microns was added, and the resulting mixture is being used for a prime coat about 100 microns thick on a concrete surface. 128 parts of the above described resin-hardening agent mixture is being admixed to 768 parts of corundum grit or granlules of the following grain-size composition:

384 parts of corundum between 0.07 and 0.12 mm.
92 parts of corundum between 0.12 and 0.25 mm.
92 parts of corundum between 0.25 and 0.5 mm.
200 parts of corundum between 0.5 and 1.0 mm.

The mixture of resin-hardening agent etc. and corundum can be applied very easily in any desired thickness with a trowel or a smoothing tool. 7.8 kg. of the resin-corundum grit mixture per cm.$^2$ are resulting a second coat of about 3 mm. thickness. The wear of this coating according to Boehme (corresponding with the German industrial standard DIN 52,108) is 1.9 cm.$^3$ per 50 cm.$^2$ as compared with 15 cm.$^3$ per 50 cm.$^2$ in the case of concrete. The compressive strength (as per DIN 1100) of the coating is 812 to 1068 kg. per cm.$^2$.

Unless otherwise stated, all parts and all ratios in the foregoing specification and examples are by weight.

What is claimed is:

1. Process for the production of a corrosion-resistant, highly wear-resistant coating, which comprises applying to the surface to be coated a mixture of epoxy resin, oxygen-containing flexibilizer compound, epoxy resin-hardening agent and a filler selected from the group consisting of corundum, silicon carbide, and mixtures thereof, and allowing the mixture to harden in situ, the epoxy resin being a polyepoxide which is liquid at room temperature and containing at least 2 epoxy equivalents per molecule, the flexibilizer compound being present in an amount of between about 1–20% by weight based on the resin quantity, the hardening agent being selected from the group consisting of polyethers of aliphatic oxyamines and polyvalent aliphatic alcohols, and mixtures thereof with cycloaliphatic polyamines, and the filler being present in the mixture in the form of dust having a particle size of between about 0–60 microns and in an amount of between about 10–200% by weight based on the resin quantity and in the form of granules having a particle size between about 0.07–2 mm. and in an amount between about 100–900% by weight based on the resin quantity.

2. Process according to claim 1 wherein the epoxy resin is selected from the group consisting of glycidyl ethers of polyvalent phenols, mixtures of glycidyl ethers of polyvalent phenols and glycidyl ethers of polyvalent aliphatic alcohols, and mixtures of glycidyl ethers of polyvalent phenols and N-glycidyl compounds; and wherein the flexibilizer compound is selected from the group consisting of aliphatic monoepoxides having more than 6 carbon atoms, glycidyl ethers of aliphatic alcohols having more than 4 carbon atoms, glycidyl ethers of aliphatic mercaptans having more than 4 carbon atoms, dialkyl esters of β-thiodialkanoic acid, and mixtures thereof.

3. Process according to claim 2 wherein a hardening accelerator is added to the mixture to shorten the hardening time thereof.

4. Process according to claim 3 wherein said accelerator is selected from the group consisting of monovalent phenols, polyvalent phenols, monovalent aliphatic alcohols, polyvalent aliphatic alcohols, mercapto compounds, and thioether compounds.

5. Process according to claim 2 wherein a plasticizer is also present in said mixture.

6. Process according to claim 2 wherein a pigment is also present in said mixture.

7. Process according to claim 2 wherein a thixotropic substance is also present in said mixture.

8. Process according to claim 2 wherein the mixture is applied in a first coating portion having a thickness of between about 60–200 microns and containing the filler in the form of dust having a particle size of between about 5–60 microns and in an amount of between about 50–150% by weight based on the resin quantity, and thereafter in a second coating portion having the desired thickness containing the filler in the form of granules having a particle size of between about 0.12–1 mm. and in an amount of between about 150–300% by weight based on the resin quantity.

9. Process according to claim 2 wherein the mixture is applied such that first the resin, flexibilizer compound and hardening agent in admixture are spread onto the surface to be coated, and after initial, partial hardening the filler is spread over the so-coated surface and forced by mechanical pressure into the initially partially hardened coating.

10. Process according to claim 2 wherein the filler is corundum having an aluminum oxide content of between about 95–100% by weight and correspondingly a titanium dioxide content of between about 0–4% by weight, the corundum dust having a particle size of between about 5–60 microns and being present in an amount of between about 50–150% by weight based on the resin quantity, and the corundum granules having a particle size of between about 0.12–1 mm. and being present in an amount of between about 150–300% by weight based on the resin quantity.

11. Process for the production of a corrosion-resistant, slip-resistant, highly wear-resistant, highly flexible, and strongly adhesive coating, which comprises applying to the surface to be coated a mixture of an epoxy resin which is liquid at room temperature and consists of a polyepoxide containing at least 2 epoxy equivalents per molecule, said epoxy resin being selected from the group consisting of glycidyl ethers of polyvalent phenols, mixtures of glycidyl ethers of polyvalent phenols and glycidyl ethers of polyvalent aliphatic alcohols, and mixtures of glycidyl ethers of polyvalent phenols and N-glycidyl compounds; a flexibilizer compound in an amount of between about 5–15% by weight based on the resin quantity, said flexibilizer compound being selected from the group consisting of aliphatic monoepoxides having more than 6 carbon atoms, glycidyl ethers of aliphatic alcohols having more than 4 carbon atoms, glycidyl ethers of aliphatic mercaptans having more than 4 carbon atoms, dialkyl esters of β-thiodialkanoic acid, and mixtures thereof; an epoxy resin-hardening agent in the form of a mixture of about equal parts of 4,4'-diaminodicyclohexylmethane and 1,4 - butyleneglycoldiaminopropyl ether; and a filler selected from the group consisting of corundum, silicon carbide, and mixtures thereof, said filler being present in the mixture in the form of dust having a particle size of between about 5–60 microns and in an amount of between about 10–100% by weight based on the resin quantity and in the form of granules having a particle size of between about 0.12–1 mm. and in an amount of between about 150–300% by weight based on the resin quantity; and allowing the mixture to harden in situ.

12. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesivity than concrete and said resin coating containing in the unhardened state a mixture of an epoxy resin consisting of a polyepoxide having at least 2 epoxy equivalents per molecule and being liquid at room temperature, said epoxy resin being selected from the group consisting of glycidyl ethers of polyvalent phenols, mixtures of glycidyl ethers of polyvalent phenols and glycidyl ethers of polyvalent aliphatic alcohols, and mixtures of glycidyl ethers of polyvalent phenols and N-glycidyl compounds; a flexibilizer compound in an amount of between about 1–20% by weight based on the resin quantity, said flexibilizer compound being selected from the group consisting of aliphatic monoepoxides having more than 6 carbon atoms, glycidyl ethers of aliphatic alcohols having more than 4 carbon atoms, glycidyl ethers of aliphatic mercaptans having more than 4 carbon atoms, dialkyl esters of $\beta$-thiodialkanoic acid, and mixtures thereof; an epoxy resin-hardening agent selected from the group consisting of polyethers of aliphatic oxyamines and polyvalent aliphatic alcohols, and mixtures thereof with cycloaliphatic polyamines and a filler selected from the group consisting of corundum, silicon carbide, and mixtures thereof, said filler being present in the mixture in the form of dust having a particle size of between about 0–60 microns and in an amount of between about 10–200% by weight based on the resin quantity and in the form of granules having a particle size of between about 0.07–2 mm. and in an amount of between about 100–900% by weight based on the resin quantity.

13. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesion than concrete and said resin coating containing in the unhardened state a mixture of a liquid epoxy resin made from bisphenol A and epichlorohydrin and containing about 0.53 epoxy equivalent per 100 grams of resin; 2-ethylhexylglycide ether as flexibilizer in an amount of between about 5–15% by weight based on the resin quantity; a mixture of about equal parts of N-cyclohexyl-1,3-diaminopropane and 1,4-butyleneglycoldiaminopropyl ether as hardening agent; and corundum as filler in the form of dust having a particle size of between about 5–60 microns and in an amount of between about 10–100% by weight based on the resin quantity and in the form of granules having a particle size of between about 0.07–2 mm. and in an amount of between about 150–300% by weight based on the resin quantity.

14. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesion than concrete and said resin coating containing in the unhardened state a mixture of a liquid epoxy resin made from bisphenol A and epichlorohydrin and containing about 0.53 epoxy equivalent per 100 grams of resin; laurylglycide ether as flexibilizer in an amount of between about 5–15% by weight based on the resin quantity; triphenylphosphite as plasticizer; a mixture of about equal parts of 4,4'-diaminodicyclohexylmethane and 1,4 - butyleneglycoldiaminopropyl ether as hardening agent; and corundum as filler in the form of dust having a particle size of between about 5–60 microns and in an amount of between about 10–100% by weight based on the resin quantity and in the form of granules having a particle size of between about 0.07–2 mm. and in an amount of between about 150–300% by weight based on the resin quantity; said coating containing a surface mixture of granular corundum and silicon carbide having a particle size of between about 0.5–1 mm. embedded into the upper surface thereof.

15. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesion than concrete and said resin coating containing in the unhardened state a mixture of a liquid epoxy resin made from bisphenol A and epichlorohydrin and containing about 0.53 epoxy equivalent per 100 grams of resin; a mixture in the ratio of about 2:1 of glycerindiglycidylether and 2-ethylhexylglycidyether as flexibilizer in an amount of between about 5–15% by weight based on the resin quantity; a mixture of about equal parts of N-cyclohexyl-1,3-diaminopropane and 1,4-butyleneglycoldiaminopropylether as hardening agent; and corundum as filler in the form of dust having a particle size of between about 5–60 microns and in an amount of between about 10–100% by weight based on the resin quantity and in the form of granules having a particle size of between about 0.07–2 mm. and in an amount of between about 150–300% by weight based on the resin quantity.

16. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesion than concrete and said resin coating including a bottom layer containing in the unhardened state a mixture of a liquid epoxy resin made from bisphenol A and epichlorohydrin and containing about 0.53 epoxy equivalent per 100 grams of resin; 2-ethylhexylglycide ether as flexibilizer in an amount of between about 5–15% by weight based on the resin quantity; triphenylphosphite as plasticizer; a member selected from the group consisting of polyethers of aliphatic oxyamines and polyvalent aliphatic alcohols, and mixtures thereof with cycloaliphatic polyamines as hardening agent; zinc duct as pigment; and corundum as filler in the form of dust having a particle size of between about 5–60 microns and in an amount of between about 10–100% by weight based on the resin quantity and in the form of granules having a particle size of between about 0.07–2 mm. and in an amount of between about 150–300% by weight based on the resin quantity; said coating further including a top layer of the same mixture, with the omission of the zinc dust, and a surface amount of granular corundum having a particle size of between about 0.5–1 mm. embedded into such top layer.

17. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesion than concrete and said resin coating containing in the unhardened state a mixture of a liquid epoxy resin made from bisphenol A and epichlorohydrin and containing about 0.53 epoxy equivalent per 100 grams of resin; $\beta$-thiodipropionic acid dimethyl ester as flexibilizer in an amount of between about 5–15% by weight based on the resin quantity; a member selected from the group consisting of polyethers of aliphatic oxyamines and polyvalent aliphatic alcohols, and mixtures thereof with cycloaliphatic polyamines as hardening agent; and corundum as filler in the form of dust having a particle size of between about 5–60 microns and in an amount of between about 10–100% by weight based on the resin quantity and in the form of granules having a particle size of between about 0.07–2 mm. and in an amount of between about 150–300% by weight based on the resin quantity; said coating containing a surface amount of granular corundum having a particle size of between about 0.25–0.5 mm. embedded into the upper surface thereof.

18. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesion than concrete and said resin coating containing a bottom layer which in the unhardened state consists of a mixture of a liquid epoxy resin made from bisphenol A and epichlorhydrin and containing about 0.53 epoxy equivalent per 100 grams of resin; 2-(2-ethylhexyloxy)-ethylglycidyl ether as flexibilizer in an amount of between about 5–15% by weight based on the resin quantity; triphenylphosphite as plasticizer; a member selected from the group consisting of polyethers of aliphatic oxyamines and polyvalent aliphatic alcohols, and mixtures thereof with cycloaliphatic polyamines as hardening agent; lead chromate as pigment; and corundum as filler in the form of dust having a particle size of between about 0–60 microns and in an amount of between about 10–100% by weight based on the resin quantity; as well as a separate top layer which in the unhardened state consists of a mixture of said liquid epoxy resin; 2-ethylhexylglycide ether as flexibilizer in an amount of between about 5–15% by weight based on the resin quantity; triphenylphosphite as plasticizer; a member selected from the group consisting of polyethers of aliphatic oxyamines and polyvalent aliphatic alcohols, and mixtures thereof with cycloaliphatic polyamines as hardening agent; finely divided silicic acid as thixotropic agent; and corundum in the form of granules having a particle size of between about 0.07–0.5 mm. and in an amount of between about 150–300% by weight based on the resin quantity; said coating containing a surface amount of granular corundum having a particle size of between about 0.5–1 mm. embedded into the upper surface thereof.

19. Corrosion-resistant, slip-resistant, highly wear-resistant, highly flexible and strongly adhesive hardened epoxy resin coating in covering disposition on a surface treated therewith, said resin coating having higher wear-resistance and stronger inherent adhesion than concrete and said resin coating containing in the unhardened state a mixture of a liquid epoxy resin made from bisphenol A and epichlorohydrin and containing about 0.53 epoxy equivalent per 100 grams of resin; 2-ethylhexylglycide ether as flexibilizer in an amount of between about 5–15% by weight based on the resin quantity; a member selected from the group consisting of polyethers of aliphatic oxyamines and polyvalent aliphatic alcohols, and mixtures thereof with cycloaliphatic polyamines as hardening agent; and corundum as filler in the form of granules having a particle size of between about 0.5–1 mm. and in an amount of between about 150–300% by weight based on the resin quantity; said coating containing said corundum embedded into the upper surface thereof.

References Cited

UNITED STATES PATENTS

| | | |
|---|---|---|
| 2,512,996 | 6/1950 | Bixler. |
| 2,602,785 | 7/1952 | Wiles et al. |
| 2,682,515 | 6/1954 | Naps. |
| 2,779,668 | 1/1957 | Daniels et al. |
| 2,829,124 | 4/1958 | Napravik _____ 117—33 X |
| 2,842,929 | 7/1958 | Schultz et al. |
| 2,862,838 | 12/1958 | Radley _____ 117—33 X |
| 2,887,458 | 5/1959 | Fitzgerald et al. __ 117—161 X |
| 2,895,389 | 7/1959 | Nagin _____ 117—33 X |
| 2,941,455 | 6/1960 | Nagin. |
| 2,943,953 | 7/1960 | Daniel _____ 117—161 X |
| 2,948,201 | 8/1960 | Nagin et al. _____ 117—161 X |
| 2,970,971 | 2/1961 | Katz et al. |
| 2,981,702 | 4/1961 | St. Clair et al. |
| 2,982,752 | 5/1961 | Phillips et al. _____ 260—81.2 |
| 3,012,487 | 12/1961 | Mika _____ 117—33 X |
| 3,044,900 | 7/1962 | Ford _____ 117—161 X |
| 3,072,843 | 1/1963 | Clements et al. ___ 117—161 X |
| 3,080,253 | 4/1963 | Dietz _____ 117—29 X |
| 3,086,888 | 4/1963 | Stratton et al. ____ 117—161 X |
| 3,160,518 | 12/1964 | Jorda _____ 117—161 X |
| 3,195,993 | 7/1965 | Gladstone _____ 51—298 |
| 3,202,947 | 8/1965 | Budovec. |
| 3,205,054 | 9/1965 | Tucker _____ 51—298 |
| 3,226,214 | 12/1965 | Daniels et al. _____ 51—298 |
| 3,227,604 | 1/1966 | Morgan _____ 161—162 |

WILLIAM D. MARTIN, *Primary Examiner.*

T. G. DAVIS, *Examiner.*